(12) United States Patent
Maruyama et al.

(10) Patent No.: US 10,249,327 B2
(45) Date of Patent: Apr. 2, 2019

(54) DISK DEVICE, CONTROLLER CIRCUIT, AND CONTROL METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Syosuke Maruyama, Machida Tokyo (JP); Kana Furuhashi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 15/910,457

(22) Filed: Mar. 2, 2018

(65) Prior Publication Data

US 2018/0308512 A1   Oct. 25, 2018

(30) Foreign Application Priority Data

Apr. 25, 2017   (JP) .................................. 2017-086463

(51) Int. Cl.
*G11B 5/09*   (2006.01)

(52) U.S. Cl.
CPC ...................................... *G11B 5/09* (2013.01)

(58) Field of Classification Search
None
See application file for complete search history.

(56) References Cited

U.S. PATENT DOCUMENTS

| 4,885,458 | A | * | 12/1989 | Horiguchi | ............ | G11B 7/0033 |
| | | | | | | 235/454 |
| 5,592,452 | A | * | 1/1997 | Yoshimoto | ............ | G06F 3/0601 |
| | | | | | | 369/275.1 |
| 7,263,650 | B2 | | 8/2007 | Keeler et al. | | |
| 9,019,640 | B2 | | 4/2015 | Reddy et al. | | |
| 2003/0002399 | A1 | * | 1/2003 | Millikan | .............. | G11B 27/105 |
| | | | | | | 369/30.23 |
| 2010/0246247 | A1 | * | 9/2010 | Kim | .................. | G11C 13/0004 |
| | | | | | | 365/163 |
| 2013/0083417 | A1 | * | 4/2013 | Worrell | .................. | G11B 5/012 |
| | | | | | | 360/45 |
| 2015/0015983 | A1 | * | 1/2015 | Jeong | ............... | G11B 20/10212 |
| | | | | | | 360/45 |

FOREIGN PATENT DOCUMENTS

JP          H05-35416 A       2/1993

* cited by examiner

*Primary Examiner* — Peter Vincent Agustin
(74) *Attorney, Agent, or Firm* — Kim & Stewart LLP

(57) ABSTRACT

A disk device includes a recording medium on which data is recorded, a decoding circuit configured to decode data read from the recording medium, and a control circuit. The control circuit is configured to cause first data associated with a target sector referenced in a read request to be read from a target track of the recording medium, second data associated with a non-target sector that is not referenced in the read request to be read from the recording medium after the first data is read from the recording medium, and decoding of the first data to be completed by the decoding circuit after the second data is read from the recording medium.

13 Claims, 7 Drawing Sheets

FIG. 1
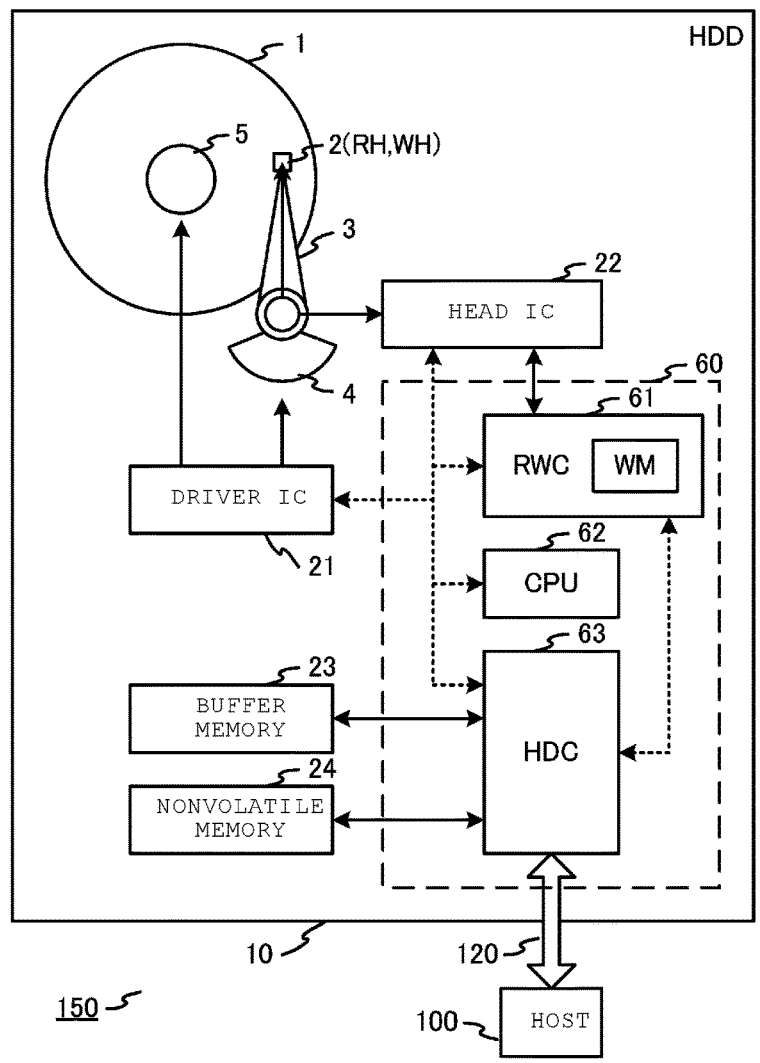
FIG. 2
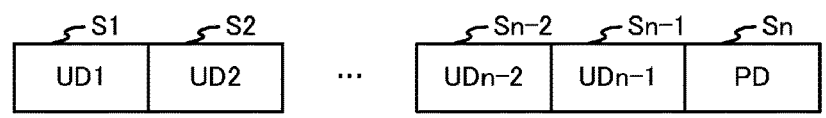
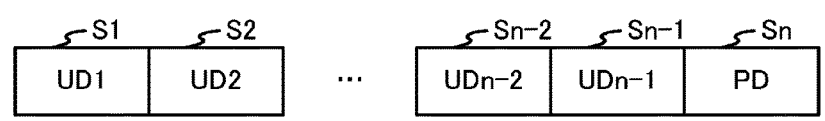

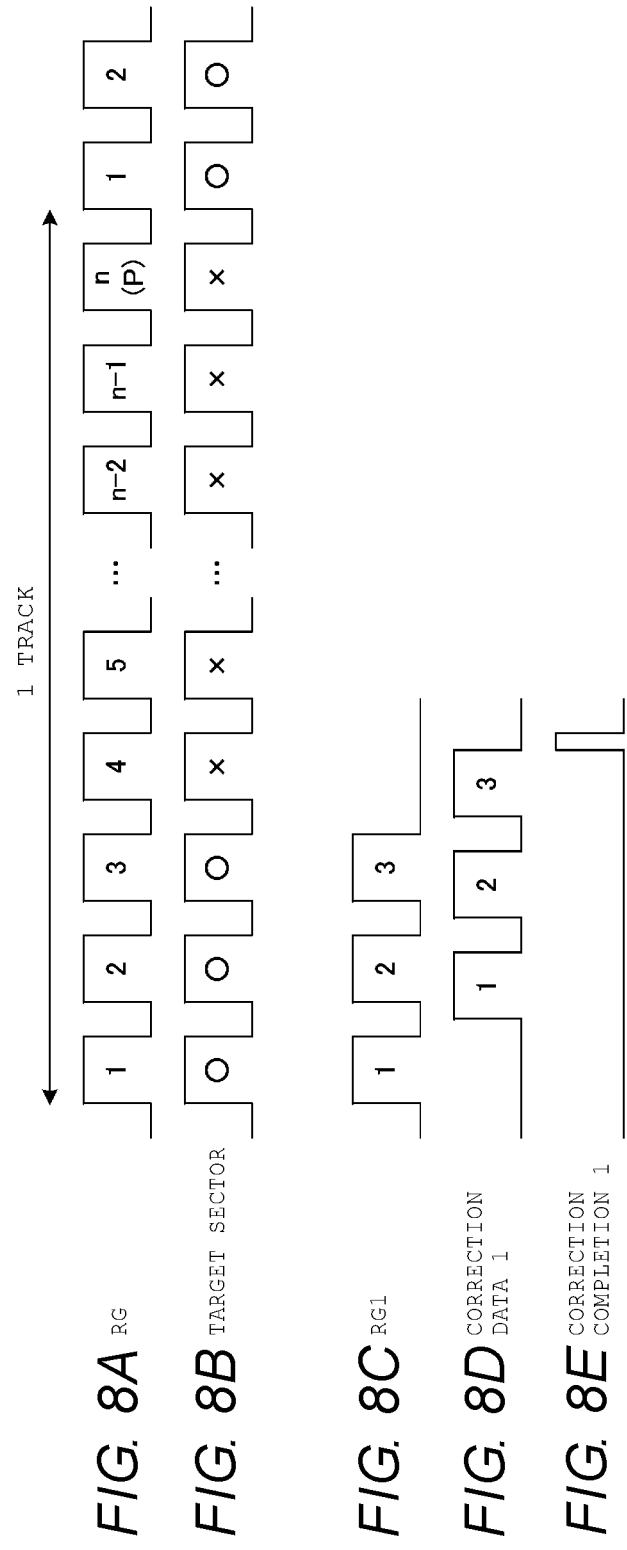

DISK DEVICE, CONTROLLER CIRCUIT, AND CONTROL METHOD

CROSS-REFERENCE TO RELATED APPLICATION

This application is based upon and claims the benefit of priority from Japanese Patent Application No. 2017-086463, filed Apr. 25, 2017, the entire contents of which are incorporated herein by reference.

FIELD

Embodiments described herein relate generally to a disk device, a controller circuit, and a control method of controlling the reading of data from a disk.

BACKGROUND

In recent years, recording media can include disk devices with reading heads facing the magnetic disks. Such disk devices include hard disk drives (HDDs). When reading data from magnetic disks in HDDs, desired data can be obtained by reading magnetic information with one or more read heads from target positions on the rotating magnetic disks and then demodulating the magnetic information. When the reading of the magnetic information from the magnetic disks is completed, the demodulation of the magnetic information is not instantaneously completed. In addition, the magnetic information may not be demodulated in some cases (such as when the read data contains an error). In this case, parameters associated with the reading process are changed and reading is retried. Whether it is necessary to retry the reading is determined after the magnetic information is demodulated or after the demodulated data is verified. When retrying of the reading is required, a rotation waiting time is sometimes necessary before target positions in the circumferential direction of the magnetic disks can be accessed again by a read head of the HDD, which can significantly increase the time required to perform the reading retry. It is desirable to shorten a time necessary for a reading retry.

DESCRIPTION OF THE DRAWINGS

FIG. 1 is a block diagram illustrating a configuration of a system including a disk device according to an embodiment.

FIG. 2 is a diagram illustrating an example of user data and correction data recorded on a recording surface of a disk.

FIGS. 8A to 8E are diagrams illustrating an operation example of the third read process according to the third embodiment.

DETAILED DESCRIPTION

Figure 3:
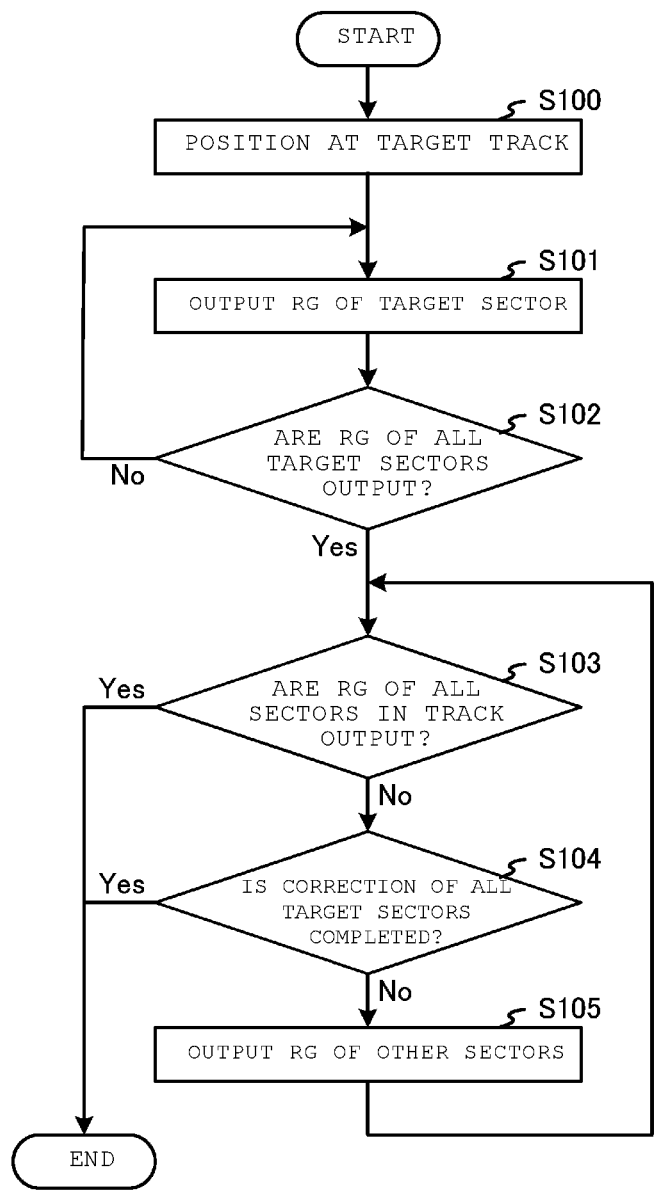
FIG. 3 is a flowchart illustrating an operation of a first read process executed by an HDD according to a first embodiment.

Embodiments provide a disk device, a controller circuit, and a control method for controlling reading of data from a magnetic disk.

In general, according to one embodiment, a disk device includes a recording medium on which data is recorded, a decoding circuit configured to decode data read from the recording medium, and a control circuit. The control circuit is configured to cause first data associated with a target sector referenced in a read request to be read from a target track of the recording medium, second data associated with a non-target sector that is not referenced in the read request to be read from the recording medium after the first data is read from the recording medium, and decoding of the first data to be completed by the decoding circuit after the second data is read from the recording medium.

Hereinafter, a plurality of embodiments will be described with reference to the drawings. Embodiments of the present disclosure are not limited to the various embodiments described below in conjunction with the drawings.

FIG. 1 is a block diagram illustrating a configuration of a system 150 including a disk device 10 according to an embodiment. In the embodiment, a hard disk drive (hereinafter also referred to as an HDD) 10 is shown as one example of the disk device 10. The system 150 includes a host 100 and the HDD 10. A host interface (I/F) 120 connects the host 100 to the HDD 10 and is used to transmit and receive a command, data, a command response, or a status report between the host 100 and the HDD 10. The host I/F 120 conforms to, for example, the Serial Advanced Technology Attachment (SATA) standard or the Serial Attached SCSI (SAS) standard. The HDD 10 is connected to the host 100 via the host I/F 120 and functions as a data memory unit of the host 100. For example, the system 150 can be a personal computer, a mobile apparatus, or a server apparatus. For example, the host 100 is a chip set IC provided in a personal computer or a mobile apparatus, or a server controller included in a server apparatus.

The HDD 10 includes a head-disk assembly (HDA) including a magnetic disk (hereinafter simply referred to as a disk) 1, a slider 2, an arm 3, an voice coil motor (VCM) 4, and a spindle motor (SPM) 5. Each constituent of the HDA is positioned inside a housing (not illustrated) of the HDD 10. The slider 2 includes a head unit including a read head RH and a write head WH. The HDD 10 includes a circuit block including a motor driver IC (hereinafter also referred to as a driver IC) 21, a head amplifier IC (hereinafter referred to as a head IC) 22, a buffer memory 23, a nonvolatile memory 24, and a controller 60. The controller 60 includes a read-write channel (hereinafter also referred to as an RWC) 61, a CPU 62, and a hard disk controller (hereinafter also referred to as an HDC) 63. The RWC 61 includes at least a work memory WM.

The HDD 10 according to the embodiment executes at least a process (a write process) of recording data on the disk 1, a process (a read process) of reading data recorded on the disk 1, and a process (servo process) of locating a part (mainly, the head unit) of the slider 2 to a target position on the disk 1. The servo process includes a process of positioning the head unit to a specific radius position (target position) of the disk 1 and a process (seek process) of moving the head unit in a radial direction on the disk 1. The servo process is executed as part of a write process or a read process in some cases.

The write process, the read process, and the servo process, according to the embodiment, are executed by the HDD 10 in response to a command transmitted from the host 100 or in response to a spontaneous request in the HDD 10. The processes are controlled according to a program (e.g., implemented in firmware) that is executed by the CPU 62. Data of the program is stored in a nonvolatile manner in the nonvolatile memory 24 and/or the disk 1.

The disk 1 is rotated by the SPM 5. The rotation of the SPM 5 is controlled in accordance with a driving voltage or a driving current from the driver IC 21. Together the arm 3 and the VCM 4 make up an actuator. The slider 2 is mounted on one end of the arm 3, and the actuator moves the slider 2 to the target position on the disk 1. That is, the VCM 4 drives the actuator to move the slider 2 mounted on the arm 3 in a radial direction of the disk 1 The VCM 4 is controlled according to a driving voltage or a driving current from the driver IC 21.

The disk 1 includes at least one recording surface. A track (data track) is formed by recording data on the recording surface. Thus, the disk 1 is a recording medium with a recording surface that records data in data tracks. The recording surface of the disk 1 has at least a servo region in which servo data is recorded to control a position of the slider 2 on the recording surface, a user data region for recording user data transmitted from the host 100, and a system region for recording system data used to manage the user data recorded in the user data region. The recording surface of the disk 1 may further include a cache region in which user data to be recorded in the user data region is temporarily recorded. The servo data is data that is recorded in a process of manufacturing the HDD 10 and is not recorded after shipment of the HDD 10. The system data includes data being managed as part of a write process and/or a read process performed by the HDD 10. The system data may be recorded on the nonvolatile memory 24 rather than the system region of the disk 1. The user data includes data to be transmitted from the host 100 and recorded in a nonvolatile manner, data already recorded in the user data region or the cache region, and data read from the user data region or the cache region. Hereinafter, the user data is simply written as data in some cases. The user data is recorded in units of a sector in the user data region or in the cache region. The sector is a minimum unit of data on which the error correction process is executed in the RWC 61, also referred to herein as a "sector unit." The correction data used to correct an error of the user data other is recorded in the user data region in addition to the user data. One sector of correction data may be installed for a plurality of sectors. In the embodiment, correction data is installed in a track on which the user data is recorded in a plurality of sectors.

An example of the user data and the correction data recorded on the recording surface of the disk 1 will now be described with reference to FIG. 2. FIG. 2 is a diagram illustrating an example of the user data and the correction data recorded on the recording surface of the disk 1.

As illustrated in FIG. 2, a track on a recording surface of the disk 1 includes sectors S1 to Sn. Each of the sectors S1 to Sn is a unit of an error correction process that is the size of a sector (or "sector unit"). The sizes of the sectors S1 to Sn are the same. In the track, user data UD1 to UDn-1 are recorded in sectors S1 to Sn-1, respectively and correction data PD is further recorded in the sector Sn. For example, the correction data PD can be obtained by executing an exclusive-or (XOR) operation of bits of the user data UD1 to UDn-1. The correction data PD may be recorded in the foremost sector or a halfway sector rather than the final sector Sn of the sectors S1 to Sn. In the reading of the user data UD1 to UDn-1 recorded in the sectors S1 to Sn-1, some of the user data UD1 to UDn-1 may not be corrected through an error correction process performed on data stored in a particular sector. In this case, there is a possibility that uncorrectable user data in the particular sector can be corrected by executing the error correction process on the track that includes the sector that cannot be corrected (i.e., executing the error correction process on a "track unit"). Specifically, such an error correction process uses the user data UD1 to UDn-1 recorded in the sectors S1 to Sn-1 as well as the correction data PD recorded in the sector Sn. That is, in an error correction process being performed with data from each sector of the track, it is necessary to read data recorded in all the sectors (the sectors S1 to Sn) in the track. Hereinafter, the user data UD1 to UDn-1 recorded in the sectors S1 to Sn-1 and the correction data PD recorded in the sector Sn are simply referred to as "sectors".

Referring back to FIG. 1, the slider 2 includes the read head RH and the write head WH (hereinafter also referred to collectively as a "head unit"). The read head RH reads data recorded in the track on the disk 1. The read data includes servo data, user data, and system data. The write head WH writes the user data and the system data on the disk 1. The read head RH is configured as a reading unit and the write head WH is configured as a writing unit. In the following description, the slider 2 is also referred to as a head or a head unit in some cases. In FIG. 1, the single disk 1 and slider 2 are illustrated. In the HDD 10, a plurality of disks may be included, as well as a plurality of sliders that each corresponds to a respective recording surface of the plurality of disks.

The head IC 22 includes a read amplifier and a write driver (neither of which is illustrated). The read amplifier outputs a signal (i.e., an amplified signal) obtained by amplifying a read signal read by the read head RH to the RWC 61. The write driver outputs a write current in accordance with write data supplied from the RWC 61 to the write head WH.

The controller 60 is configured with an integrated circuit in which at least the RWC 61, the CPU 62, and the HDC 63 are integrated as one chip. The controller 60 is configured with a semiconductor circuit such as a system-on-chip (SoC), a field-programmable gate array (FPGA), an application-specific integrated circuit (ASIC), or a large-scale integration (LSI) chip. The buffer memory 23 is a volatile semiconductor memory capable of executing higher data transmission than the disk 1 and may be implemented as a dynamic random-access memory (DRAM), a synchronous DRAM (SDRAM) and/or or a static RAM (SRAM). The nonvolatile memory 24 is a nonvolatile semiconductor memory and may include a NOR- or NAND-based flash memory. The buffer memory 23 and the nonvolatile memory 24 may not be external to the controller 60 and may be incorporated in the controller 60. A part of the recording region of the disk 1 may be employed as the nonvolatile memory 24.

The RWC 61 includes at least an interface circuit, a read channel circuit, and a write channel circuit (none of which are illustrated) for direct communication with the HDC 63. The RWC 61 includes the work memory WM. The work memory WM is, for example, an SRAM, and may be external to the RWC 61. The RWC 61 exchanges a command, data, a command response, a status report, or the like with the HDC 63 via the interface circuit. The read channel circuit processes an amplified signal supplied from the head IC 22 and decodes the data including the servo data and the user data. In decoding of data by the read channel circuit, the RWC 61 executes the error correction process, including detecting and correcting an error of the user data. The RWC 61 also reports a result or a state of the error correction process to the HDC 63. The RWC 61 stores data for executing the error correction process in the work memory WM. The RWC 61 executes the error correction process in units of sectors or tracks in the read channel circuit. The write channel outputs write data to the head IC 22. The write channel obtains such write data by encoding data which is to be written and is supplied from the HDC 63. In the embodiment, the RWC 61 encodes and decodes data using an LDPC code. Therefore, the read channel includes a Viterbi decoding circuit and a low-density parity-check (LDPC) decoding circuit.

The HDC 63 includes at least a plurality of interface circuits that transmit to and receive data from the buffer memory 23, the nonvolatile memory 24, the RWC 61, and the host 100. The HDC 63 is connected to the buffer memory 23 and the nonvolatile memory 24 and controls transmission and reception of data transmitted between the buffer memory 23 and the nonvolatile memory 24. The data transmitted between the HDC 63 and the buffer memory 23 includes read data and write data transmitted between the host 100 and the RWC 61. The read data is user data read from the disk 1 and the write data is user data to be written on the disk 1. The data transmitted between the HDC 63 and the nonvolatile memory 24 includes system data and a program which is executed by the CPU 62. The HDC 63 exchanges a command, data, a command response, a status report, or the like with the RWC 61 via the interface circuit for direct communication with the RWC 61. The HDC 63 executes a process for the read data input from the RWC 61 or the write data to be output to the RWC 61. Further, the HDC 63 is connected to the host 100 and executes a process for a command and data transmitted from the host 100. The HDC 63 also outputs a command response, a status report, and data to the host 100. That is, the HDC 63 executes a plurality of processes including a process related to a write gate in the write process, a process related to a read gate in the read process, and a process related to a servo gate necessary for servo control.

The CPU 62 is an IC called a microprocessor or a microcontroller. The CPU 62 controls the VCM 4 via the driver IC 21 to execute positioning control (servo control) of the head unit (the read head RH and the write head WH). The servo control includes at least control for locating the head unit to a certain position in the radial direction of the disk 1 and control (seeking control) for moving a current position of the head unit to a target position on the disk 1. The CPU 62 controls the write process and the read process on the disk 1 via at least the RWC 61 and the HDC 63. In controlling the plurality of processes, the CPU 62 uses the HDA and the circuit blocks described above according to programming. The CPU 62 is configured as a control unit or a control circuit that controls a plurality of processes.

In the above-described configuration, the HDD 10 according to the embodiment can execute a plurality of processes to be described below in detail.

First Embodiment

A read process for reading data from the disk 1 according to the first embodiment will now be described with reference to FIG. 3. FIG. 3 is a flowchart illustrating an operation of a first read process executed by the HDD 10 according to the first embodiment.

The flowchart illustrated in FIG. 3 starts after the servo process (the seeking process) has been executed for locating the head unit (the read head RH) to a target track that includes a target sector that is a target of the read process. In the first read process executed in the first embodiment, data of the target sector is first read on the target track and data of another sector that is a non-target sector on the same track is read as necessary. The first read process is executed in response to receipt of a command indicating a data read request from the host 100 or in response to a read request occurring inside the HDD 10. The read request occurring inside the HDD 10 includes a read request based on a refresh process or a verifying process on data recorded on the disk 1. The first read process is executed mainly by the RWC 61 and the HDC 63.

The CPU 62 executes the seeking process in the target track in response to a read request. Thus, the head unit is positioned at the target track (S100). The CPU 62 supplies information regarding the read request to the HDC 63 with the execution of the seeking process. This information includes information regarding positions of target sectors or the number of target sectors in the target track. The HDC 63 waits for rotation of the disk 1 until a target sector included in the target track is detected, and outputs the read gate RG for the target sector to the RWC 61 in response to the detection of the target sector (S101). Thus, the HDC 63 detects the target sector by waiting for detection of a first target sector included in the target track as the disk 1 rotates. The RWC 61 decodes an amplified signal supplied from the head IC 22 in accordance with the read gate RG input from the HDC 63. The RWC 61 executes the error correction process using the work memory WM in this decoding and reports a result of this process to the HDC 63. That is, the output of the read gate RG to the RWC 61 by the HDC 63 is equivalent to the decoding of the amplified signal supplied by the RWC 61.

The HDC 63 determines whether the read gates RG for all the target sectors included in the target track are output (S102). When it is determined that the read gates RG of all the target sectors are not output (No in S102), the process returns to (S101). When it is determined that the read gates RG of all the target sectors are output (Yes in S102), the process proceeds to (S103). That is, the HDC 63 sequentially outputs the read gates RG to the RWC 61 for each of the target sectors included in the target track. In (S103), the HDC 63 determines whether the read gates RG for all the sectors included in the target track (both target sectors and non-target sectors) are output to the RWC 61. When it is determined that the read gates RG for all the sectors in the target track are output (Yes in S103), the process ends. Conversely, when it is determined that the read gates RG have not been not output (it is determined that the read gates RG for all the sectors in the target track are not yet output) (No in S103), the HDC 63 determines whether the error correction process is completed on all the target sectors, based on a result of the error correction process (decoding) reported from the RWC 61 (S104).

In the first read process according to the first embodiment, the HDC 63 ascertains at least the positions or the number of all target sectors. Accordingly, for example, when a result of the error correction process is sequentially reported from the RWC 61 to the HDC 63 for each target sector, the HDC 63 can determine whether the decoding of all the target sectors is completed, based on the sequentially reported results of the error correction process of all the target sectors. For example, the HDC 63 may supply the RWC 61 with information regarding the positions or the number of all target sectors. In this case, the HDC 63 supplies the RWC 61 with the information regarding the positions or the number of all target sectors with the output of the read gate RG for the final target sector. Further, the HDC 63 supplies the RWC 61 with identification information for specifying the sector corresponding to the output read gate RG whenever the read gate RG is output. Thus, the RWC 61 can determine whether the decoding of all the target sectors is completed. As a result, the RWC 61 reports the result of the error correction process for each target sector, and therefore can report the completion of the decoding to the HDC 63 in response to the completion of the decoding of all the target sectors. In either case, based on the result of the error correction process reported from the RWC 61, the HDC 63 can determine whether the decoding of all the target sectors is completed.

When it is determined that the decoding is completed (Yes in S104), the process ends. Conversely, when it is determined that the decoding is not completed (No in S104), the HDC 63 outputs the read gates RG for other sectors other than the target sectors in the target track to the RWC 61 (S105). Thereafter, when it is determined that the read gates RG for all the sectors in the target track are output (Yes in S103), the process returns to (S103) and the output of the read gates RG for other sectors in the target track (S105) is repeated until completion of the decoding of all the target sectors (Yes in S104).

In this flowchart, when the read gates RG for all the sectors including the target sectors in the target track are output (Yes in S103), the completion of the decoding of all the target sectors is not determined. However, by reading all the sectors in the target track, the RWC 61 can execute not only the error correction process for a particular target sector but also the error correction process based on data from each sector in the target track. Accordingly, even when the error correction process in the sector unit is not completed on all the target sectors (that is, the error correction process may not be executed for one or more target sectors), the error correction process can be completed on all the target sectors through the error correction process being performed on the data from each sector of the track. Specifically, the error correction process is performed on the data from each sector of the track using the correction sector included in the target track. After the first read process is completed, the process proceeds to a subsequent process. For example, the CPU 62 may execute a process of setting and calculating parameters for the seeking process in another track. After this process, the CPU 62 can execute the seeking process for another track.

In this way, the HDD 10 according to the first embodiment executes the first read process mainly using the RWC 61 and the HDC 63. In the first read process, a read process is executed on another sector other than the target sector included in the target track without waiting for the completion of the error correction process on the sector of the target sector included in the target track, i.e., without waiting for the completion of the error correction process on the "sector unit." That is, in the first read process according to the first embodiment, when the error correction process for the target sector is not completed, a duration of the error correction process being performed on data from each sector of the track that includes the target sector (the error correction process on the "track unit") can be reduced.

An operation example of the first read process described in FIG. 3 will now be described with reference to FIGS. 4A to 4H. FIGS. 4A to 4H are diagrams illustrating an operation example of the first read process according to the first embodiment.

Figure 4:
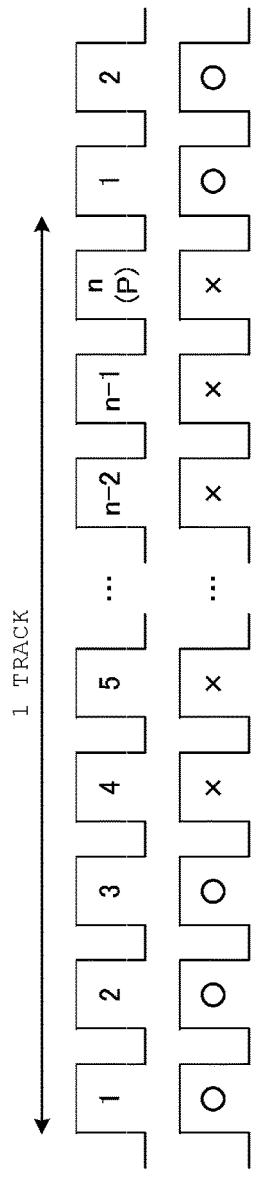
FIGS. 4A to 4H are diagrams illustrating an operation example of the first read process according to the first embodiment.

FIG. 4A depicts the read gate output from the HDC 63 to the RWC 61. One track includes the sectors S1 to Sn. Accordingly, with rotation of the disk 1, the sectors S1 to Sn are sequentially detected and sectors 1 and 2 are detected again immediately after the sector Sn. Codes in each read gate RG indicate a state in which the user data UD1 to UDn-1 are respectively recorded in the sectors S1 to Sn-1 and the correction data PD is recorded in the sector Sn. That is, with rotation of the disk 1, the user data UD1 to UDn-1 or the correction data PD is read from the disk 1 and supplied to the RWC 61 in accordance with each read gate. In FIG. 4B, "o" indicates target sectors referenced in the read request among the sectors S1 to Sn and "x" indicates sectors other than the target sectors of the target track. That is, in this example, the target sectors are the sectors S1 to S3 and the other sectors are not the target sectors of the target track. When data associated with the target sectors is received, the HDC 63 stores the received data in the buffer memory 23. However, when data associated with the sectors other than the target sectors is received, the HDC 63 discards the received data without storing the received data in the buffer memory 23. An example in which the first read process is executed on a certain track of the disk 1 on which such data is recorded will be described in conjunction with the flowchart illustrated in FIG. 3.

First, an example will be described. As illustrated in FIG. 4C, the read gate RG for the sectors S1 to S3, which are the target sectors, is output after waiting for rotation of the disk 1 (No in S101 and S102 of FIG. 3). When the read gate RG for the sector S3 is output (Yes in S102), the read gate RG for all the sectors in the target track has not yet been output (No of S103). When the error correction process (the decoding) on all the target sectors is not completed (No in S104), the read gate RG for the other subsequent sector S4 other than the target sectors is output (S105). Thereafter, in response to the detection of the completion of the error correction process of all the target sectors S1 to S3 (Yes in S104), the first read process ends. Upon completion of the first read process, for example, the CPU 62 can execute a process of setting and calculating parameters for a seeking process to another track that includes additional target sectors.

The HDC 63 may detect that the error correction process on all the target sectors S1 to S3 is completed in response to receipt of the user data UD1 to UD3 from the RWC 61, where the user data UD1 to UD3 corresponds to the sectors S1 to S3, which are the target sectors (see FIG. 4D). A predetermined time interval is necessary from when data is input to the RWC 61 in accordance with the read gate RG until the error correction process (the decoding) by the RWC 61 is completed. A duration of the time interval during which the completion of the error correction process occurs is generally different for each sector. Accordingly, as illustrated in FIG. 4D, the error correction process for data input to the RWC 61 associated with one read gate RG (e.g., for sector S1) may not be said to be completed before the next read gate RG occurs, (e.g., the read gate for sector S2). For example, the RWC 61 may detect that the error correction process on the user data UD1 to UD3 corresponding to the sectors S1 to S3 (which are all the target sectors) is completed and the RWC 61 may report the detection of the completion of the error correction process to the HDC 63 (see FIG. 4E). In either case, the HDC 63 receives the user data UD4 associated with the sector S4, which is not one of the target sectors S1 to S3, before the RWC 61 detects that the error correction process on the user data UD1 to UD3 corresponding to the sectors S1 to S3 is completed. The HDC 63 then discards the received user data UD4 without storing the user data UD4 in the buffer memory 23 because the error correction process is completed in the target sectors.

Next, another example will be described. As illustrated in FIG. 4F, when the read gate RG for the final sector S3 among the target sectors is output (Yes in S102), the read gate RG for all the sectors in the target track have not yet been output (No in S103). When the error correction process on all the target sectors is not completed (No in S104), the read gate RG for the sector S4 is output (S105). Thereafter, since the error correction process on the sector S2 among the target sectors is not completed, the same state (No in S103 and No in S104) is maintained, and the read gate RG for the other sectors S5 to Sn are subsequently output (S105). Thereafter, the first read process ends in response to the output of the read gate RG for all the sectors (Yes in S103). Upon completion of the first read process, for example, the CPU can execute a process of setting and calculating parameters for seeking target sectors in another track and perform the seek to the target sectors.

In the other example, either the RWC 61 or the HDC 63 may detect that the error correction process on all the target sectors S1 to S3 has not been completed during the first read process. However, by outputting the read gate RG for all the sectors S1 to Sn in the target track, all the user data UD1 to UDn-1 and the correction data PD are read during a single rotation of the disk 1 and stored in the work memory WM in the RWC 61. Thus, when the error correction process on a target sector is not completed in the first read process, the user data UD1 to UDn-1 and the correction data PD that are used to implement the performance of the error correction process on the data of the entire track are read without performing an additional rotation of the disk 1. Accordingly, even when the error correction for a particular sector of the user data (e.g., user data UD2) cannot be completed, the error correction on the user data UD2 using data of the entire track can be executed without executing a read process on the same track again. As a result, as illustrated in FIG. 4G, after the read gate RG for all the sectors S1 to Sn in the target track is output, the user data UD2 is determined by the RWC 61 via the error correction process using the data of the entire track. The RWC 61 then outputs the user data UD2 to the HDC 63. As illustrated in FIG. 4H, after the read gate RG for all the sectors S1 to Sn in the target track is output, the RWC 61 detects that the error correction process of the user data UD2 is completed through the error correction process that uses the data of the entire track, and the RWC 61 may report the detection of the completion of the error correction process to the HDC 63. In either case, the HDC 63 receives the user data UD4 to UDn-1 associated with the sectors S4 to Sn (which are not the target sectors S1 to S3) and discards the user data UD4 to UDn-1 without storing the user data UD4 to UDn-1 in the buffer memory 23. The CPU 62 can output the read gate RG for all the sectors S1 to Sn without waiting for output of all the user data UD1 to UDn-1 from the RWC 61 and can subsequently execute a process of preparing the seeking process in a subsequent track and the seeking process. In any example described above, the reading of the data from the magnetic disk can be appropriately controlled through the first read process according to the first embodiment.

Second Embodiment

Figure 5:
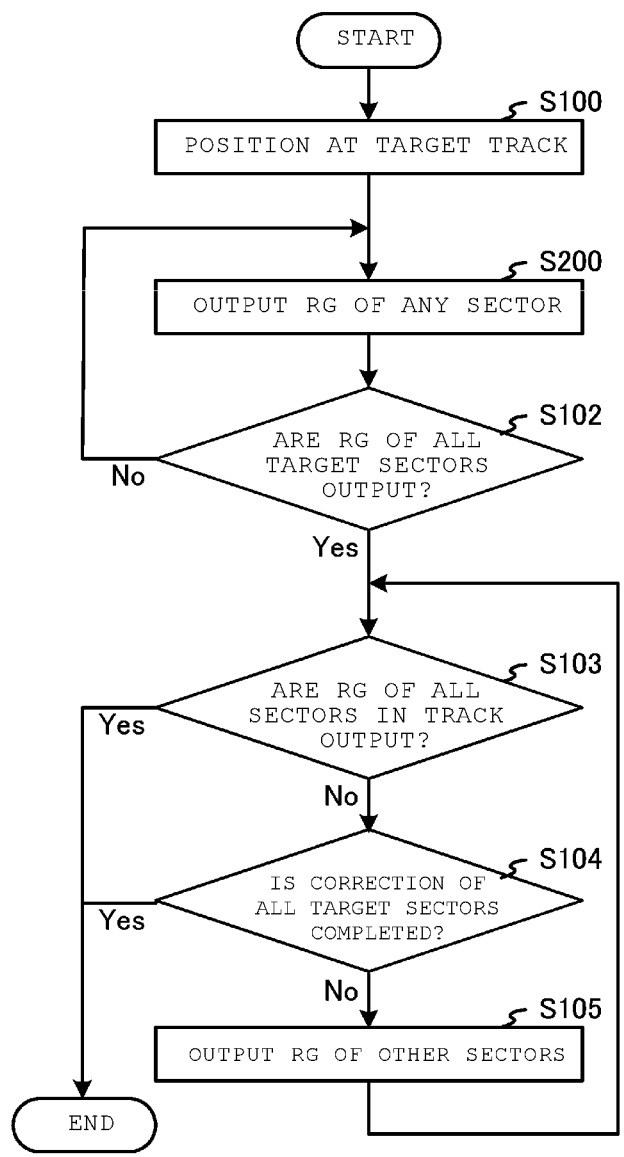
FIG. 5 is a flowchart illustrating a second read process executed by an HDD according to a second embodiment.

Next, a process for reading data according to a second embodiment will be described with reference to FIG. 5. FIG. 5 is a flowchart illustrating a second read process executed by the HDD 10 according to the second embodiment.

The second read process executed in the second embodiment is different from the first read process in that the second read process is not limited to reading of data of the first target sector. In the following description, different configurations from the first read process will be described in detail and description of elements similar to those previously described will be simplified or omitted. The second read process is executed in response to receipt of a command indicating a data read request from the host 100 or a response to a read request occurring inside the HDD 10. The second read process is executed mainly by the RWC 61 and the HDC 63.

When the head unit (the read head RH) is positioned at the target track by a seeking process (S100), the HDC 63 outputs the read gate RG for any sector included in the target track to the RWC 61 when specific output conditions of the read gate RG for the sector are satisfied (S200). The RWC 61 executes decoding (an error correction process) on data associated with the sectors corresponding to the each of the read gates RG input from the HDC 63. The specific output conditions of the read gate RG include: 1) a condition that the target track is stably traced in the servo control and 2) a condition that the read channel circuit enters a state in which data can be decoded. That is, the HDC 63 does not wait for detection of the target sectors included in the target track in accordance with rotation of the disk 1. Instead, the HDC 63 outputs the read gate RG for any sector included in the target track to the RWC 61.

The HDC 63 determines whether the read gates RG for all the target sectors included in the target track are output (S102). Since the HDC 63 outputs the read gate RG for any sector in (S200), there is a possibility of the read gate RG not being output for a certain sector of the target sectors at this time point. That is, when it is determined that the read gates RG of all the target sectors have not been output to the RWC 61 (No in S102), (S200) is executed again. However, even after step S200 is repeated, there is a possibility of the read gate RG not being output for one or more sectors of the target sectors. However, by repeatedly executing steps S102 (No of S102) and S200, it is determined that the read gate RG for all the target sectors is output (Yes in S102). Thereafter, when it is determined that the read gates RG for all the sectors in the target track are output (Yes in S103), the output of the read gates RG for other sectors in the target track (S105) is repeated until completion of the decoding of all the target sectors (Yes in S104). After the second read process is completed, the process can proceed to a subsequent process. For example, the CPU 62 can execute a process of setting and calculating parameters for the seeking process in a different track as the subsequent process. After this process, the CPU 62 can execute the seeking process in the different track.

In this way, in the second read process executed by the HDD 10 according to the second embodiment, the error correction process on another sector other than the target sector included in the target track is executed without waiting for the completion of the error correction process on the target sector included in the target track. The read gate RG for any sector included in the target track is output to the RWC 61 when specific output conditions of the read gate RG for the sector are satisfied. The RWC 61 sequentially performs decoding (the error correction process) on the data associated with the sector corresponding to a particular input read gate RG. That is, in the second read process according to the second embodiment, the time interval during which the error correction process is performed with data from the entire track that includes the target sector can be reduced when the error correction process on a specific target sector cannot be completed.

Here, an example of the operation of the second read process described in FIG. 5 will be described with reference to FIGS. 6A to 6H. FIGS. 6A to 6H are diagrams illustrating an example of the second read process according to the second embodiment. Since FIGS. 6A to 6H are substantially similar to FIGS. 4A to 4H, differences from FIGS. 4A to 4H will be described in detail and the description of the previously-described points will be simplified or omitted.

Figure 6:
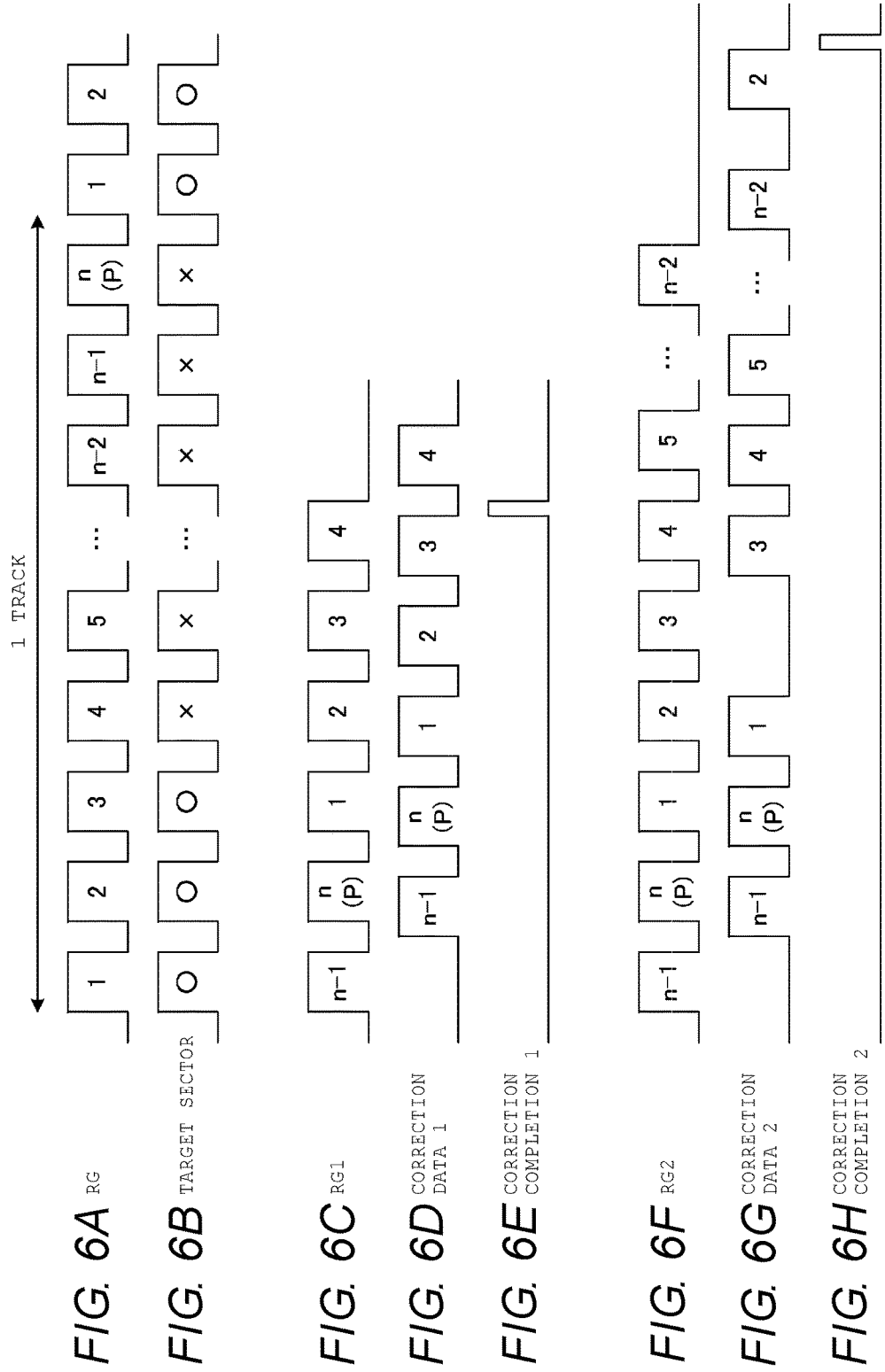
FIGS. 6A to 6H are diagrams illustrating an operation example of the second read process according to the second embodiment.

FIGS. 6A and 6B are substantially similar to FIGS. 4A and 4B. In this example, the target sectors are the sectors S1 to S3 and the other sectors are not the target sectors. The HDC 63 stores data associated with the target sectors in the buffer memory 23 and discards data pertaining to the sectors other than the target sectors without storing the data in the buffer memory 23. Now, an example in which the second read process is executed on a track of the disk 1 on which such data is recorded will be described in conjunction with the flowchart illustrated in FIG. 5.

First, an example will be described. As illustrated in FIG. 6C, the read gate RG for any sector (here, sector n-1) included in the target track and a plurality of sectors that are subsequent to this sector and are included in the target track is sequentially output (S200 and No in S102 of FIG. 5). When the read gate RG for the sector S3 is output, and therefore the read gates RG for all of the target sectors have been output (Yes in S102), the read gate RG for all the sectors in the target track have not yet been output (No of S103). When the error correction process (the decoding) on all the target sectors has not yet been completed (No in S104), the read gate RG for the subsequent sectors other than the target sectors, such as sector S4, is output (S105). Thereafter, in response to the detection of the completion of the error correction process of all the target sectors S1 to S3 (Yes in S104), the second read process ends. Upon completion of the second read process, for example, the CPU 62 can execute a process of setting and calculating parameters for seeking target sectors in another track and seeking to the target sectors.

The HDC 63 may detect that the error correction process on all the target sectors S1 to S3 is completed in response to receipt of the user data UD1 to UD3 corresponding to the sectors S1 to S3 which are the target sectors from the RWC 61 (see FIG. 6D). For example, the RWC 61 may detect that the error correction process on the user data UD1 to UD3 corresponding to the sectors S1 to S3 (which are all the target sectors) is completed. The RWC 61 may then report the detection of the completion of the error correction process to the HDC 63 (see FIG. 6E). In either case, the HDC 63 discards the user data UD4 and UDn-1 associated with the sectors S4, Sn-1, and Sn (i.e., sectors other than the target sectors S1 to S3) without storing the user data UD4 and UDn-1 in the buffer memory 23.

Next, another example will be described. As illustrated in FIG. 6F, the read gate RG from any particular sector included in the target track (here, sector n-1) to the plurality of sectors subsequent to this particular sector, up to and including the final target sector, is sequentially output (S200 and No in S102 of FIG. 5). When the read gate RG for the final sector S3 among the target sectors is output (Yes in S102), the read gate RG for all the sectors in the target track have generally not been output yet (No in S103). When the error correction process on all the target sectors has not been completed (No in S104), the read gate RG for the sector S4 is output (S105). Thereafter, since the error correction process on the sector S2 among the target sectors has not yet been completed (as illustrated in FIG. 6G), the same state (No in S103 and No in S104) continues and the read gate RG for the other sectors subsequent to the sector S4 (i.e., sectors S5 to Sn-2) is output (S105). Then, the second read process ends in response to the output of the read gate RG for all the sectors being completed (Yes in S103). Thereafter, for example, the CPU 62 can execute a process of setting and calculating parameters for seeking target tracks in another track and seeking to the target tracks.

In the other example, by outputting the read gate RG for all the sectors S1 to Sn in the target track, all the user data UD1 to UDn-1 and the correction data PD are read during a single rotation of the disk 1 and stored in the work memory WM in the RWC 61. Accordingly, even when the error correction for a particular sector (e.g., on the user data UD2) cannot be executed, the error correction process for the user data UD2 can be executed without executing the read process on the same track again. As a result, as illustrated in FIG. 6G, after the read gate RG for all the sectors S1 to Sn in the target track is output, the user data UD2 is output from the RWC 61 to the HDC 63 via error correction using data of the entire target track. As illustrated in FIG. 6H, after the read gates RG for all the sectors S1 to Sn in the target track are output, the RWC 61 detects that the error correction process on the user data UD2 is completed through the error correction using data of the entire target track, and the RWC 61 may report the detection of the completion of the error correction process to the HDC 63. In either case, the HDC 63 discards the user data UD4 to UDn-1 associated with the sectors other than the target sectors S1 to S3 (i.e., the sectors S4 to Sn) without storing the user data UD4 to UDn-1 in the buffer memory 23. The CPU 62 can output the read gate RG for all the sectors S1 to Sn without waiting for output of all the user data UD1 to UDn-1 from the RWC 61 and can subsequently execute a process of preparing a seeking process in a subsequent target track and performing the seeking process. In any example described above, the reading of the data from the magnetic disk can be appropriately controlled through the second read process according to the second embodiment.

Third Embodiment

Figure 7:
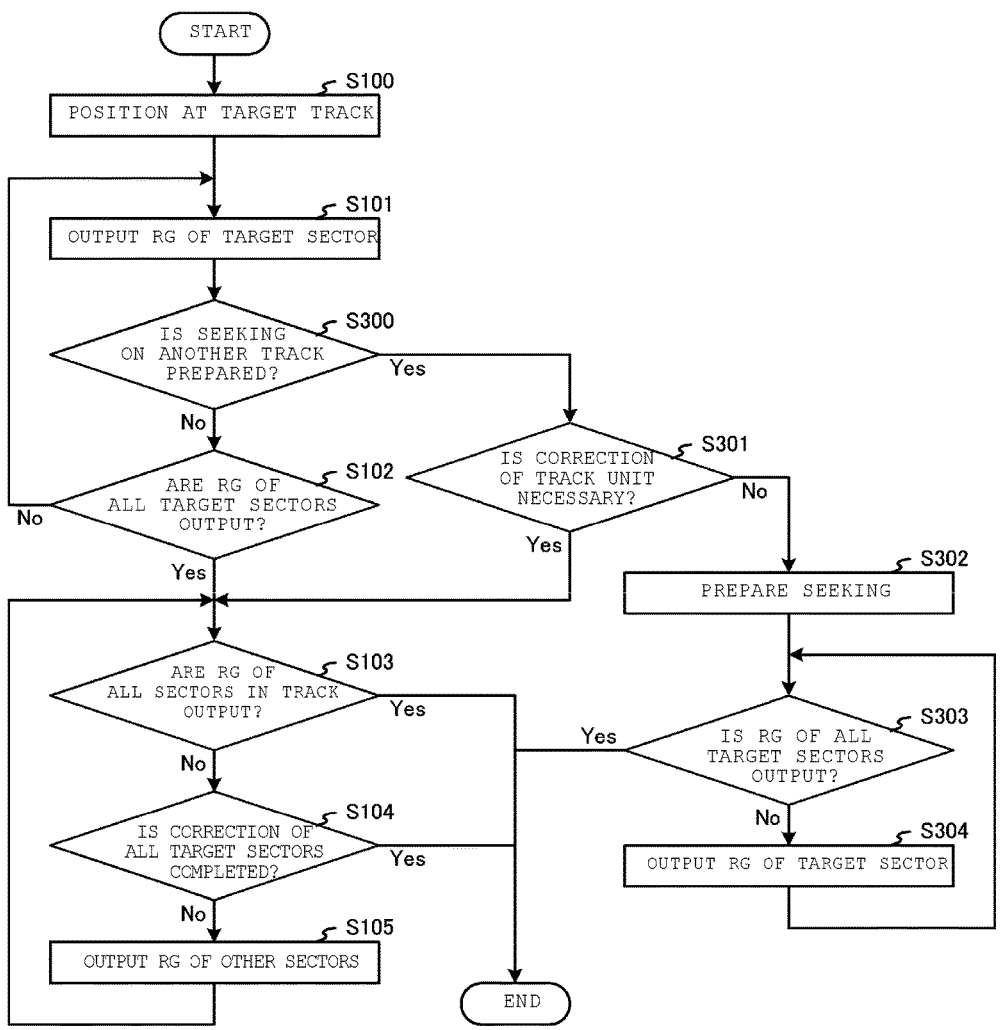
FIG. 7 is a flowchart illustrating a third read process executed by an HDD according to a third embodiment.

Next, an operation of a read process for data according to a third embodiment will be described with reference to FIG. 7. FIG. 7 is a flowchart illustrating a third read process executed by the HDD 10 according to the third embodiment.

The third read process executed in the third embodiment is different from the first read process in that the seeking process to a second track starts to be prepared without waiting for completion of the error correction of data read from all the target sectors or output of the read gate RG for all the sectors in a first target track. In the following description, different configurations from the first read process will be described in detail and description of similar elements already described will be simplified or omitted. The third read process is executed in response to a read request from the host 100 or to an internal read request, such as a read request generated by the HDD 10. The third read process is executed mainly by the RWC 61 and the HDC 63 under the control of the CPU 62.

When the head unit (the read head RH) is positioned at the target track via a seeking process to the target track (S100), the HDC 63 outputs the read gate RG for the first target sector to the RWC 61 in response to the detection of the first target sector as the disk 1 rotates (S101). Here, the CPU 62 determines whether a process of preparing the seeking process on another track different from the target track has been performed (S300). This process includes, for example, a process of setting and calculating parameters for the seeking process to a subsequent target track. When it is determined that the process of preparing the seeking process has not been executed (No in S300), the HDC 63 determines whether the read gate RG for all the target sectors in the target track have been output (S102). When it is determined that the read gate RG for all the target sectors have not been output (No in S102), the process returns to (S101). When it is determined that the read gate RG for all the target sectors in the target track have been output (Yes in S102), the process proceeds to (S103). After (S103), the same process as the first read process, described above, is executed.

Conversely, when it is determined that the process of preparing the seeking process has been executed (Yes in S300), the HDC 63 determines whether the error correction process for the target sector is necessary based on a result of the error correction process (the decoding) reported from the RWC 61 (S301). At this time point, the RWC 61 executes the error correction process on the data read from the target sector. For example, when the error correction process on data from the target sector is not completed even after a predetermined time elapses for the target sector or the error correction process for the target sector fails, the RWC 61 may output to the HDC 63 information indicating that the error correction process using data from the entire target track is necessary. When it is determined that the error correction process using data from the entire target track is necessary (Yes in S301), the process proceeds to (S103). After (S103), the same process as the first read process is executed. However, when the read gate RG for all the target sectors have not yet been output, the HDC 63 may output the read gate RG for the remaining target sectors, and subsequently the process subsequent to (S103) may be executed. When it is determined that the error correction process using data from the entire target track is not necessary (No in S301), the process proceeds to (S302).

In (S302), the CPU 62 executes the process of preparing the seeking process on the subsequent target track. Then, the HDC 63 determines whether the read gate RG for all the target sectors has been output (S303). When it is determined that the read gate RG for all the target sectors has not been output (No in S303), the HDC 63 outputs the read gate RG for the subsequent target sector to the RWC 61 (S304) and determines again whether the read gate RG for all the target sectors is output (S303). When it is determined that the read gate RG for all the target sectors have been output (Yes in S303), the process ends.

In this way, the HDD 10 according to the third embodiment executes the third read process mainly using the RWC 61 and the HDC 63 under the control of the CPU 62. In the third read process, when it is determined that the preparation of the seeking process for the subsequent target track has been executed (Yes in S300) and the RWC 61 determines that the error correction process on the target sector using data from the entire target track (correction of track unit) is not necessary (No in S301), while the read gate RG on a certain sector among the target sectors is output (S101 and S102), the process of preparing a subsequent seeking process is executed and the read gate RG for each of the remaining target sectors is continuously output (No in S303, and S304). In this case, the HDD 10 proceeds to the seeking process on another track (i.e., the subsequent target track) without waiting for completion of the error correction process for the target sector. For the user data read from the disk 1, there is a high possibility of the error correction process in the sector unit being successful when the influence of a mechanical or environmental disturbance is small. When the RWC 61 determines that the error correction process for the target sector using data from the entire target track is not necessary, a possibility of the error correction process on the target sector being completed (succeeding) using data from that target sector but not from the entire track is expected to be high. That is, in the third read process according to the third embodiment, for the data for which there is a high possibility of successful completion of the error correction process that is based on the target sector, the process proceeds to a subsequent process (for example, the seeking process on another track) without outputting the read gate RG on the sectors other than the target sectors and without waiting for the result of the error correction process on the target sectors. Therefore, a time in which the error correction process can be completed on a target sector can be reduced.

Here, an example of the operation of the third read process described in FIG. 7 will be described with reference to FIGS. 8A to 8E. FIGS. 8A to 8E are diagrams illustrating an operation example of the third read process according to the third embodiment. Since FIGS. 8A to 8E are substantially the same as FIGS. 4A to 4H, differences from FIGS. 4A to 4H will be described in detail while similar elements will be simplified or omitted.

FIGS. 8A and 8B are substantially the same as FIGS. 4A and 4B. In this example, the target sectors are the sectors S1 to S3 and the other sectors are not target sectors. The HDC 63 stores data associated with the target sectors in the buffer memory 23 and discards data associated with the sectors other than the target sectors without storing the data in the buffer memory 23. An example in which the third read process is executed on a track on which such data is recorded will now be described in conjunction with the flowchart illustrated in FIG. 7.

As illustrated in FIG. 8C, the read gate RG for each of the sectors from the first target sector S1 to a plurality of target sectors subsequent to the first target sector S1 is sequentially output (S101 and No in S102 of FIG. 7). During this period, the process of preparing the seeking process on another track is determined (Yes in S300) and the RWC 61 determines that the error correction process on the target sector based on a track unit (i.e., data from the entire target track) is not necessary (No in S301). In this case, the process of preparing a subsequent seeking process for a subsequent target track is executed (S302) while the read gate RG for the remaining target sectors (S2 and S3) among the target sectors is output (No of S303, and S304). The third read process ends in response to the output (Yes of S303) of the read gate RG for all the target sectors S1 to S3 being completed. Thereafter, for example, the CPU 62 can execute the seeking process on the subsequent target track that includes subsequent target sectors.

As illustrated in FIG. 8D, after the read gate RG for the user data UD1 to UD3 corresponding to all the target sectors S1 to S3 is output, the user data UD1 to UD3 corresponding to the target sectors S1 to S3 are output from the RWC 61 to the HDC 63. Thus, the HDC 63 can detect that the error correction process on all the target sectors S1 to S3 is completed. As illustrated in FIG. 8E, the RWC 61 may detect that the error correction process on the user data UD1 to UD3 corresponding to all the target sectors S1 to S3 is completed and reports the detection of the completion of the error correction process to the HDC 63. In either case, the HDC 63 stores the user data UD1 to UD3 corresponding to the target sectors S1 to S3 in the buffer memory 23. Further, the CPU 62 can execute the seeking process on the subsequent target track without waiting for output of the user data UD1 to UD3 from the RWC 61. As described above, the reading of the data from the magnetic disk can be appropriately controlled through the third read process according to the third embodiment.

Examples of Modifications to Third Embodiment

The third read process according to the third embodiment described with reference to FIGS. 7 and 8A to 8E and the second read process according to the second embodiment described with reference to FIG. 5 and FIGS. 6A to 6H may be combined. That is, in the third read process, the data of the first target sector may not be read, but the data of any sector included in the target track may be read that satisfies certain output conditions of the read gate RG. Even in this case, for data for which there is a high probability of the error correction process for a target sector being successfully completed that is based on a sector unit, the process proceeds to subsequent processes (for example, a process of preparing a seek process for a subsequent target track and performing such a seek process) without outputting the read gate RG for the sectors subsequent to the target sectors and without waiting for the result of the error correction process on the target sectors. Therefore, a time in which the error correction processes on the target sectors can be reduced.

While the plurality of embodiments has been described above, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. Further, the plurality of constituent elements disclosed in the above-described embodiments can be appropriately combined to realize various embodiments. For example, several constituent elements may be deleted from all the constituent elements described in the embodiments or constituent elements related to other embodiments may be appropriately combined. The accompanying claims and their equivalents are intended to cover such forms or modifications as would fall within the scope and spirit of the inventions.

What is claimed is:

1. A disk device comprising:
a recording medium on which data is recorded;
a decoding circuit configured to decode data read from the recording medium; and
a control circuit configured to cause first data associated with a target sector referenced in a read request to be read from a target track of the recording medium, second data associated with a non-target sector that is not referenced in the read request to be read from the recording medium after the first data is read from the recording medium, and decoding of the first data to be completed by the decoding circuit after the second data is read from the recording medium, wherein
the decoding circuit is configured to execute a first decoding process on the first data based on data from the target sector and not on data from any other sector of the target track and a second decoding process on the first data based on data from each sector of the target track, and
the control circuit is configured to perform the second decoding process on the first data when the first decoding process fails to decode the first data.

2. The disk device according to claim 1, wherein the non-target sector is located in the target track.

3. The disk device according to claim 1, wherein the control circuit is configured to, in response to failure of the first decoding process to decode the first data, continue reading data from the target track until data from each sector of the target track is read.

4. The disk device according to claim 1, wherein the control circuit is configured to stop reading the second data in response to a successful decoding of the first data by the decoding circuit via the first decoding process.

5. The disk device according to claim 1, wherein the control circuit is further configured to read third data in response to the read request and prior to reading the first data, the third data being associated with an additional non-target sector of the target track that is not referenced in the read request.

6. The disk device according to claim 5, wherein the control circuit is configured to employ the third data in the second decoding process.

7. The disk device according to claim 1, further comprising:
a memory that is configured to store data decoded by the decoding circuit,
wherein the control circuit is configured to cause the first data to be stored in the memory after being decoded and does not cause the second data to be stored in the memory.

8. The disk device according to claim 1, wherein the control circuit is configured to prepare a seek process associated with a different track than the target track in response to determining that a read gate has been output to a read-write channel of the disk device for each sector that is located in the target track and referenced in the read request.

9. A controller comprising:
a decoding circuit configured to decode input data; and
a control circuit configured to cause first data associated with a target sector referenced in a read request to be read from a target track of the recording medium, second data associated with a non-target sector that is not referenced in the read request to be read from the recording medium after the first data is read from the recording medium, and decoding of the first data to be completed by the decoding circuit after the second data is read from the recording medium, wherein
the decoding circuit is configured to execute a first decoding process on the first data based on data from the target sector and not on data from any other sector of the target track and a second decoding process on the first data based on data from each sector of the target track, and
the control circuit is configured to perform the second decoding process on the first data when the first decoding process fails to decode the first data.

10. The controller according to claim 9, wherein the control circuit is configured to, in response to failure of the first decoding process to decode the first data, continue reading data from the target track until data from each sector of the target track is read.

11. The controller according to claim 9,
wherein the control circuit is configured to stop reading the second data in response to the successful decoding of the first data by the decoding circuit via the first decoding process.

12. The controller according to claim 9,
wherein the control circuit is further configured to read third data in response to the read request and prior to reading the first data, the third data being associated with an additional non-target sector of the target track that is not referenced in the read request.

13. The controller according to claim 12,
wherein the control circuit is configured to employ the third data in the second decoding process.

* * * * *